United States Patent Office 3,700,611
Patented Oct. 24, 1972

3,700,611
POLYVINYL ALCOHOL-GLYOXAL-POLYOL
ADHESIVE COMPOSITION
Ralph F. Nickerson and Harold D. Weymouth, Springfield, Mass., assignors to Monsanto Company, St. Louis, Mo.
No Drawing. Continuation-in-part of application Ser. No. 775,146, Nov. 12, 1968. This application Jan. 4, 1971, Ser. No. 103,914
The portion of the term of the patent subsequent to June 17, 1988, has been disclaimed
Int. Cl. C09j 3/16
U.S. Cl. 260—17 R   16 Claims

ABSTRACT OF THE DISCLOSURE

Disclosed herein is an adhesive composition comprising (A) a polyvinyl alcohol resin, (B) glyoxal and (C) a polyol selected from the group consisting of cis 1,2-polyols and certain 1,3-polyols dispersed in an aqueous medium. The adhesive compositions may contain minor amounts of adjuvants such as inert fillers or extenders, methyl cellulose, potassium tripolyphosphate, sodium acetate and mixtures thereof.

CROSS REFERENCE TO RELATED APPLICATION

This application is a continuation-in-part of copending application Ser. No. 775,146, filed Nov. 12, 1968, and now U.S. Pat. 3,600,342, granted Aug. 17, 1971.

BACKGROUND OF THE INVENTION (1) Field of the invention

This invention relates to aqueous adhesive compositions. More particularly, this invention relates to aqueous adhesive compositions that are stable to soluble borate salts and that ultimately yield water resistant bonds. The adhesive composition comprises (A) polyvinyl alcohol, (B) glyoxal and (C) a polyol such as a cis 1,2-polyol dispersed in an aqueous medium.

(2) Description of the prior art

Polyvinyl alcohol adhesives are well known in the prior art. These materials have excellent adhesive properties and find widespread use in bonding cellulosic and other porous materials. The polyvinyl alcohol adhesives are widely used in wall board joint compounds, fiber board and box board laminating, corrugating operations and in many other paper converting uses. Although polyvinyl alcohol adhesives have excellent adhesive properties and enjoy widespread use, they suffer a drawback in that they are sensitive to the effects of certain boron compounds. At a pH of greater than about 6.0, these boron compounds cause thickening, loss of adhesion and ultimately gelation of the polyvinyl alcohol adhesive. This gelatin phenomena is described at length in U.S. Pat. 3,135,648 where the patentee, in order to prevent gelation, maintains the pH of the system below 5.5, using strong acids.

Accidental contamination of polyvinyl alcohol based adhesives with boron compounds can be a serious problem in the adhesive and related end use industries. The boron compounds are widely used as ingredients in adhesives as in casein and starch based adhesives and as tackifiers especially with starch to produce gummy characteristics and in limited amounts in conjunction with strong acids in polyvinyl alcohol adhesives. Moreover, the active boron compound may be present in the substrates to be adhered by virtue of the nature of prior treatment of these substrates. Therefore, contamination and gelation of ordinary polyvinyl alcohol adhesives may occur due to the presence of boron compounds in mixing equipment and other processing equipment such as conduits and applicator rolls or on the substrate itself.

The use of strong acids to maintain the pH of the polyvinyl alcohol systems below the gelation region gives rise to more problems such as equipment corrosion. Moreover, pH adjustment and control is difficult and extraordinary and many adhesive manufacturers and end users are unaccustomed to controlling pH. In addition the pH of many polyvinyl alcohol adhesive systems is greater than 6.0 and the use of strong acids to prevent gelation could adversely affect other adhesive properties and give rise to other equally serious problems.

Another drawback encountered in many polyvinyl alcohol based adhesives is their lack of water resistance. This is especially true of low molecular weight, partially hydrolyzed polyvinyl alcohols. Cold water solubility of these materials is desired in the formulating procedures, but the ready solubility is disadvantageous in the glue line in the finished products. The exposure of the glue line to moist high relative humidity conditions may cause failure of the adhesive bond.

The present invention obviates the problem of thickening of the adhesive and loss of adhesion and other properties which arises when the polyvinyl alcohol binder is contaminated (for example) by the borax used in the wall board material. At the same time the present invention also offers an improvement in the water resistance of the polyvinyl alcohol glue line.

SUMMARY OF THE INVENTION

The present invention relates to a borax stable, water resistant adhesive composition comprising (A) polyvinyl alcohol, (B) glyoxal and (C) a polyol selected from the group consisting of cis 1,2-polyols and certain 1,3-polyols dispersed in an aqueous medium.

The present invention solves problems previously encountered in the prior art by providing (1) an adhesive composition which is borax stable and less susceptible to adverse thickening and loss of adhesion due to interaction with the boron compounds commonly used in the adhesive industry and (2) an adhesive composition with improved water resistance.

It is an object of this invention to provide new aqueous based adhesive compositions.

It is a further object of this invention to provide aqueous based adhesive compositions which are borax stable.

It is a further object of this invention to provide an adhesive composition which will resist thickening and loss of adhesion upon interaction with the borax compounds commonly used in the adhesive industry.

DESCRIPTION OF THE PREFERRED EMBODIMENTS

The foregoing and other objects are achieved by an adhesive composition which comprises (A) polyvinyl alcohol, (B) glyoxal and (C) a polyol selected from the group consisting of cis 1,2-polyols and certain 1,3-polyols dispersed in an aqueous medium.

The polyvinyl alcohols used in the present invention are those partially and fully hydrolyzed materials which contain not more than 60% by weight of residual unhydrolyzed acetate groups, calculated as polyvinyl acetate. These polyvinyl alcohol materials have viscosities in the range of from 1.3 to 150 centipoises when measured as a 4% by weight aqueous solution at 20° C. These materials are well known to those skilled in the art and need no further description here.

The final choice of polyvinyl alcohol used will depend on the particular application and the type of adhesive properties desired. For example, fully hydrolyzed polyvinyl alcohols having a 4% aqueous solution viscosity of at least 35 centipoises would be used in fiber board and box board laminating and in corrugating applications where a much higher degree of water resistance is desired and where the application permits the cooking of the adhesive formulation. On the other hand, where cold water soluble adhesives are desired as in wall board joint cements, wall paper pastes, etc., one would use polyvinyl alcohol having an aqueous solution viscosity of less than 65 centipoises and a residual polyvinyl acetate content of from 10 to 40%.

The glyoxal used is a commercially available material which may be used in either crystalline or solution form depending on whether the adhesive composition is to be prepared in the form of a dry mix adhesive wherein the respective components are blended together or whether a paste-type adhesive is to be prepared.

The polyols used are cis 1,2-polyols such as sorbitol, mannitol, glycerol, ethylene glycol, dulcitol, etc., and 1,3-polyols such as pentaerythritol and trimethylol alkanes wherein the alkane group contains from 2 to 4 carbon atoms, for example, trimethylol ethane, trimethylol propane and trimethylol butane. Especially preferred are cis 1,2-polyols such as sorbitol and mannitol.

Although polyvinyl alcohol may be classed as a polyol, the expression polyol as used in regard to the present invention refers to the class of polyols referred to above.

The amount of glyoxal used in the polyvinyl alcohol based adhesives of the present invention is in the range of from 2 to 50 parts per hundred parts polyvinyl alcohol resin (phr.). More preferably from 10 to 30 parts of glyoxal is used per hundred parts of resin. In most rpeferred embodiment from 15 to 25 parts of glyoxal are used per hundred parts of resin.

The amount of the polyol component used in the polyvinyl alcohol based adhesives of the present invention is in the range of from 2 to 40 parts per hundred parts polyvinyl alcohol resin. More preferably, from 5 to 25 parts of the polyol component is used per hundred parts of resin. In the most preferred embodiment 10 to 20 parts of the polyol component are used per hundred parts of resin.

The adhesive compositions described above can be used as is or in conjunction with various inert fillers or extenders. These extenders and filler are well known to those skilled in the art. Examples of these materials include clay, especially kaolinite clays, dolomite, ground limestone, i.e. calcium carbonate, asbestos, mica, silica, talc, gypsum, etc.

In addition to lower adhesive costs the inert fillers and extenders are useful for controlling adhesive viscosity and penetration of the adhesive into the substrate as well as promoting quick tack, i.e., setting of the adhesive bond. As will be seen below the inert fillers or extenders can be present in amounts of up to 98 parts by weight per 100 parts of the adhesive composition.

Furthermore, the polyvinyl alcohol/glyoxal/polyol adhesives of the present invention may be further modified by incorporating therein from 0 to 300 parts per 100 parts of polyvinyl alcohol of other adhesive substances such as starch, dextrin, and polyvinyl acetate resins. Especially preferred are pearl starch and polyvinyl acetate resins which may be used in the form of polyvinyl acetate emulsions or aqueous dispersions or in the form of spray-dried polyvinyl acetate powders. The latter form is to be preferred when the adhesive compositions are to be in the form of a dry mix adhesive.

The preferred polyvinyl acetate powders used in the adhesive compositions of this invention are the free-flowing, water, dispersible powders obtained upon spray drying aqueous emulsions of polyvinyl acetate according to the process of Morrison, U.S. Pat. 2,800,463 or Bray, U.S. Pats. 3,104,234 and 3,225,425.

The aqueous adhesive compositions of the present invention are prepared by dispersing the polyvinyl alcohol, glyoxal, polyol and any additional ingredients in water so as to form an aqueous adhesive composition. The amount of water used is such so as to provide an adhesive composition with a solids content of from 2 to 70% by weight based on the total weight of the aqueous adhesive composition. Preferably, the solids content is in the range of from 5 to 60% by weight and more preferably in the range of from 5 to 40% by weight based on the total weight of the aqueous adhesive composition. The solids content is conveniently measured by heating a small sample of the aqueous adhesive composition at 110° C. for 2 hours.

Stated in another way, the amount of water used in aqueous adhesive compositions of the present invention is in the range of from 30 to 98% by weight based on the total weight of the aqueous adhesive composition. Preferably, the amount of water is in the range of from 40 to 95% by weight and more preferably in the range of from 60 to 95% by weight.

The following examples are set forth in illustration of the present invention and should not be construed as a limitation thereof. All parts and percentages are by weight unless otherwise indicated.

EXAMPLE 1

This example illustrates the superior borax stability and water resistance that may be achieved in the adhesive compositions of the present invention. One hundred (100) parts of fully hydrolyzed polyvinyl alcohol having a residual acetate content of less than 2% by weight and a 4% aqueous solution viscosity of 63 centipoises at 20 C., is dry blended with 3 parts of powdered glyoxal and 27 parts of sorbitol. The dry blend is dispersed in 890 parts of cold water and the slurry is then heated to 95° C. while maintaining agitation in order to dissolve the components. The solution is then cooled to about 25° C.

This solution is then tested for borax stability by adding, with agitation, seventy (70) ml. of a 5% borax solution to the adhesive composition. The viscosity of the adhesive composition increased slightly and the tackiness of this adhesive composition increased to a desirable level. However, there was no signs of gelation or loss of adhesion.

A laminate prepared from 64 lb. kraft sheets and the foregoing adhesive composition is found to have an excellent bond strength which was unaffected by immersion in water for 24 hours.

EXAMPLE 2

Example 1 is repeated here except that 100 parts of an aluminum-silicate clay which is identified as ASP–400 is added dry to the dry mixture of polyvinyl alcohol, glyoxal and sorbitol. This dry blend is then slurried in 770 parts of cold water and cooked as in Example 1. This composition is tested for borax stability and tackiness and is used to prepare a 64# kraft laminate as in Example 1 which laminate is subsequently tested for water resistance. The borax stability of the adhesive and the water resistance of the laminate is comparable to that observed in Example 1. However, the clay containing adhesive composition of this example showed better wet tack and less penetration in the preparation of the laminate.

The following Examples 3 and 4 are set forth as controls to show the poor borax stability of a polyvinyl alcohol adhesive that does not contain a polyol in accordance with the practice of this invention.

EXAMPLE 3

Example 1 is repeated here except that the sorbitol component is omitted in the adhesive formulation and the amount of water is increased to 897 parts. This solution is then tested for borax stability by adding, with agitation, forty-five (45) ml. of a 5% borax solution to the adhesive composition. The adhesive composition thickened considerably and underwent a substantial decrease in tackiness and adhesiveness which made the composition unsuitable as a laminating adhesive.

EXAMPLE 4

Example 2 is repeated here except that the sorbitol component is omitted in the adhesive formulation and the amount of water is increased to 797 parts.

This solution is then tested for borax stability by adding, with agitation, thirty nine (39) ml. of a 5% borax solution to the adhesive composition. The viscosity of the adhesive composition increased greatly with a substantial decrease in tackiness and adhesiveness which made the composition unsuitable as a laminating adhesive.

EXAMPLE 5

Example 1 is repeated here except that mannitol is used as the polyol compound in place of the sorbitol used in Example 1. Comparable results are obtained in the properties of the adhesive formulation and in the 64 lb. kraft laminates.

EXAMPLE 6

This example illustrates the use of the adhesive compositions of the present invention as a wallboard joint compound. The following ingredients were dry blended.

|  | Parts | |
|---|---|---|
| Binder portion: | | |
| Polyvinyl alcohol | 2.41 | |
| Glyoxal | 0.32 | |
| Sorbitol | 0.21 | |
| | 2.94 | 2.94 |
| Inert fillers: | | |
| Asbestos | 5.57 | |
| Mica | 5.57 | |
| Calcium carbonate | 84.00 | |
| Talc | 1.06 | |
| | 96.20 | 96.20 |
| Adjuvants: | | |
| Methyl cellulose | 0.56 | |
| Potassium tripolyphosphate | 0.23 | |
| Sodium acetate | 0.07 | |
| | 0.86 | 0.86 |
| Total | | 100.00 |

The polyvinyl alcohol used is a cold water soluble partially hydrolyzed material having a residual acetate content of about 20% by weight and a 4% aqueous solution viscosity of about 5 centipoises.

One hundred parts of the dry blend prepared above is slurried into 50 parts of water at 25° C. to form an adhesive composition having a consistency suitable for use as a dry wall joint compound. This material is tested for borax stability according to the procedure outlined in Example 1 above and found not to gel or undergo a decrease in adhesiveness when 10 parts of a 5% borax solution is added to the adhesive.

The adhesive composition prepared above is tested as a dry wall joint compound in accordance with the methods prescribed in ASTM C 474-61T and ASTM C 475-61T and found to have excellent overall properties such as good bond of the joint tape to the joint compound at both normal and low temperatures, easy sandability, low shrinkage, and absence of check cracking and edge cracking.

These excellent adhesive properties make the above formulation especially useful as a joint tape adhesive and finishing adhesive for use in dry wall construction.

EXAMPLE 7

This example is set forth to show the decrease in water resistance which occurs when glyoxal is omitted from the adhesive formulations of the present invention.

Example 6 is repeated here that the glyoxal is omitted from the formulation. This control formulation is used as a joint tape compound for dry wall construction. The dry wall joint along with a sample prepared using the adhesive formulation of Example 6 is then tested for adhesion after exposure to conditions of high humidity according to the following procedure.

In a modification of the ASTM method for bond of tape to joint compound, the test assembly is held for 24 hours at 40° F. and 80 to 90 percent relative humidity. Thereafter, the test assembly is dried to constant weight at 70 to 80° F. and 45 and 55 percent relative humidity. The degree of adhesion after conditioning at the higher relative humidity and the improvement on drying at the lower relative humidity are observed.

The taped dry wall joint prepared using the adhesive formulation of Example 6 which contains glyoxal shows superior adhesion after exposure to conditions of high humidity than does the dry wall joint prepared with the adhesive formulation of Example 7 which contains no glyoxal.

EXAMPLE 8

This example further illustrates the superior borax resistance of the adhesive formulations of the present invention.

Example 6 is repeated here except that the sorbitol and glyoxal are omitted from the formulation. This formulation is found to gel and lose adhesiveness when only one (1) part of a 5% borax solution is added to the formulation.

Thus, the adhesive composition of Example 6 prepared using glyoxal and sorbitol has significantly better water resistance and 10 times the borax stability as the same formulation without the polyol and glyoxal components.

EXAMPLE 9

This example is set forth to illustrate other polyols which may be used in the practice of this invention.

Example 6 is repeated here except that mannitol is used in place of the sorbitol used in Example 6. Comparable results are obtained in the properties of the adhesive formulation and in the taped dry wall test panels.

EXAMPLE 10

This example is set forth to illustrate the use of a polyvinyl acetate adhesive in conjunction with the polyvinyl alcohol/glyoxal/polyol adhesives of the present invention.

The following binder portion is prepared and dry blended with 96.8 parts of a blend of the inert fillers and adjuvants used in Example 6.

| | Parts |
|---|---|
| Polyvinyl acetate | 1.00 |
| Polyvinyl alcohol | 1.67 |
| Glyoxal | 0.32 |
| Sorbitol | 0.21 |
| Total | 3.20 |

The polyvinyl acetate used is a spray dried, water-dispersible powder obtained from an aqueous emulsion of polyvinyl acetate containing 60% solids by weight and stabilized with a 10% dextrin by weight. The powder is free-flowing and has an average particle size of approximately 15 microns.

The polyvinyl alcohol used is the same type as is used in Example 6.

The formulation was then evaluated as in Example 6 and found to be superior to the formulation prepared in Example 6 in regard to the properties of sandability and uniformity of hardness after drying.

EXAMPLE 11

Example 10 is repeated here except using the following binder.

| | Parts |
|---|---|
| Polyvinyl acetate | 1.67 |
| Polyvinyl alcohol | 1.00 |
| Glyoxal | 0.10 |
| Sorbitol | 0.21 |
| Total | 2.98 |

Comparable results are obtained in the properties of the adhesive formulation and in the taped dry wall test panels.

EXAMPLE 12

In this example the following binder is used to prepare a dry wall joint compound.

|  | Parts |
|---|---|
| Polyvinyl acetate | 15.0 |
| Polyvinyl alcohol | 5.0 |
| Glyoxal | 2.5 |
| Sorbitol | 2.0 |
| Total | 24.5 |

The polyvinyl alcohol used is a cold water soluble partially hydrolyzed material having a residual acetate content of about 22% by weight and a 4% aqueous solution viscosity of about 7.5 centipoises.

The polyvinyl acetate used is a spray dried, water-dispersible powder obtained from an aqueous emulsion of polyvinyl acetate containing 60% solids by weight and stabilized with polyvinyl alcohol. The powder is free-flowing and has an average particle size of approximately 17 microns.

This binder portion is then blended with 74.5 parts of a blend of the inert fillers and adjuvants used in Example 6. The dry blend is then dispersed in 100 parts of water and the resulting adhesive is evaluated for borax stability, water resistance and adhesive performance in dry wall construction. This formulation is found to have good borax stability and water resistance. In addition, this formulation is found to be superior in regard to the bond of the joint tape to the joint compound at both normal and low temperatures.

EXAMPLE 13

Example 12 is repeated here except that the polyvinyl acetate is added to the wet adhesive paste in the form of a 55% solids polyvinyl acetate emulsion. Comparable test results are obtained.

The amount and type of additional binder material used in the polyvinyl alcohol adhesives of the present invention will depend on the particular end use and desired adhesive properties. In cooked up paper laminating adhesives pearl starch is to be preferred while dextrin and polyvinyl acetate are preferred where fast tack is desired as in bag seam adhesives.

The total amount of binder material used in the dry wall joint compounds of the present invention varies from 2 to 20 parts by weight per hundred parts of joint compound. The remainder of the joint compound will comprise from 80 to 97 parts of inert fillers with about one (1) part of adjuvants per hundred parts of joint compound.

As indicated in Examples 6 and 10 to 12 above, in dry wall joint compounds polyvinyl alcohol may be the sole binder material or it can be used in conjunction with polyvinyl acetate. The amount of polyvinyl acetate used as additional binder material will vary from 0 to 300 parts per 100 parts of polyvinyl alcohol resin.

EXAMPLE 14

The following example is set forth to illustrate a bag seam adhesive having excellent borax stability and water resistance that is prepared in accordance with the practice of this invention.

|  | Parts |
|---|---|
| Polyvinyl alcohol | 7.0 |
| Polyvinyl acetate | 2.0 |
| Glyoxal | 0.8 |
| Sorbitol | 0.2 |
| Clay (ASP-600) | 10.0 |
| Water | 80.0 |
| Total | 100.0 |

The polyvinyl acetate used is the same as that used in Example 10 while the polyvinyl alcohol used is of the fully hydrolyzed variety having less than 1% by weight residual acetate groups and a 4% solution viscosity of 55 centipoises.

The dry ingredients are blended and dispersed in cold water. The slurry is heated to 95° C. for 15 minutes and the resulting adhesive is then cooled to 25° C.

The adhesive is tested for borax stability as in Example 1 and found to have borax stability comparable to that obtained in Example 1. This adhesive is then used to form the seams in 32 lb. kraft paper using a 1.5 mil glue line. Quick tack tests on these bag seams indicate that the adhesive sets within 60 seconds to the extent that 100% paper failure is observed after this period of time when an attempt is made to pull the seams apart.

The bag seams are allowed to dry overnight and then immersed in water at 25° C. for 48 hours. After this time the adhesive seam is tested for water resistance by tearing the seam apart. In each instance 100% paper failure occurs in the seam indicating the excellent water resistance that is achieved with the adhesive formulation of the present invention.

EXAMPLE 15

This example illustrates the use of starch as an additional binder material in a fiber board laminating adhesive formulation which is prepared in accordance with the teaching of the present invention. The following formulation is used in this example.

|  | Parts |
|---|---|
| Polyvinyl alcohol | 5.0 |
| Glyoxal | 2.0 |
| Pentaerythitol | 2.0 |
| Clay | 11.2 |
| Pearl starch | 2.2 |
| Water | 77.6 |
| Total | 100.0 |

The polyvinyl alcohol used is the same as that used in Example 1 above. The dry ingredients are dry blended, slurried in cold water and then cooked as in Example 1. This adhesive composition is found to have excellent borax stability and other adhesive properties. Laminated fiber board made with this material is found to have excellent water resistance.

EXAMPLE 16

Example 15 is repeated here except using trimethylol ethane as the polyol component. Comparable results are obtained.

EXAMPLE 17

This example illustrates the use of tricalcium phosphate to facilitate dispersion of the binder components in the aqueous medium. The following formulation is used in this example.

|  | Parts |
|---|---|
| Polyvinyl alcohol | 75 |
| Glyoxal | 15 |
| Sorbitol | 10 |
| Tricalcium phosphate | 15 |
| Total | 115 |

The polyvinyl alcohol used is the same as that used in Example 1 above. The dry ingredients are dry blended, slurried in 885 parts cold water and then cooked as in Example 1. This adhesive composition is found to have excellent borax stability and other adhesive properties. Laminated fiber board made with this material is found to have excellent water resistance.

Also contemplated for use in the practice of this invention are other adjuvants which are commonly used in adhesive formulators such as preservatives, fungicides, fluidizing agents, antifoam agents, viscosity regulators, humectants, plasticizers, solubilizing aids, pigments, dyes, odor masking compounds, etc.

From the foregoing it should be apparent that many modifications and variations may be made in the practice of the present invention without departing from the spirit and scope thereof.

What is claimed is:

1. An aqueous adhesive composition wherein the adhesive portion comprises:
   (A) from 25 to 100 parts by weight of polyvinyl alcohol;
   (B) from 0 to 75 parts by weight of polyvinyl acetate resin;
   (C) from 2 to 50 parts by weight of glyoxal per hundred parts by weight of the polyvinyl alcohol;
   (D) from 2 to 40 parts by weight of a polyol per hundred parts by weight of the polyvinyl alcohol;
wherein the total of the polyvinyl alcohol and polyvinyl acetate components is 100 parts by weight; wherein the polyol is selected from the group consisting of cis 1,2-polyols and 1,3-polyols selected from the group consisting of pentaerythritol and trimethylol alkanes wherein the alkane group contains from 2 to 4 carbon atoms; and wherein the amount of water is in the range of from 30 to 98% by weight based on the total weight of the adhesive composition.

2. The aqueous composition of claim 1 containing from 10 to 30 parts by weight of glyoxal per hundred parts of polyvinyl alcohol.

3. The aqueous composition of claim 1 containing from 5 to 25 parts by weight of the polyol component per hundred parts of polyvinyl alcohol.

4. The aqueous composition of claim 1 wherein the polyol is sorbitol or mannitol.

5. The aqueous composition of claim 1 wherein the amount of water is in the range of from 40 to 95% by weight.

6. An aqueous composition comprising:
   (I) A binder portion comprising:
      (A) from 25 to 100 parts by weight of polyvinyl alcohol;
      (B) from 0 to 75 parts of a polyvinyl acetate resin;
      (C) from 2 to 50 parts by weight of glyoxal per hundred parts by weight of the polyvinyl alcohol;
      (D) from 2 to 40 parts by weight of a polyol per hundred parts by weight of the polyvinyl alcohol;
   wherein the total of the polyvinyl alcohol and polyvinyl acetate components is 100 parts by weight; and
   (II) An inert filler portion comprising inert fillers selected from the group consisting of clay, asbestos, mica, calcium carbonate, talc and mixtures of the foregoing; wherein the binder portion comprises from 2 to 80 parts by weight of the total weight of the binder portion and inert filler portion; and
   (III) An aqueous portion wherein the amount of water is in the range of from 30 to 98% by weight based on the total weight of the adhesive composition.

7. The aqueous composition of claim 6 containing from 10 to 30 parts by weight of glyoxal per hundred parts of polyvinyl alcohol.

8. The aqueous composition of claim 6 containing from 5 to 25 parts by weight of the polyol component per hundred parts of polyvinyl alcohol.

9. The aqueous composition of claim 6 wherein the polyol is sorbitol or mannitol.

10. The aqueous composition of claim 6 wherein the amount of water is in the range of from 40 to 95% by weight.

11. A dry wall joint compound comprising an aqueous dispersion of
   (I) from 2 to 20 parts per hundred parts by weight of the dry wall joint compound of a binder portion comprising:
      (A) a polyvinyl alcohol resin having a 4% aqueous solution viscosity of less than 65 centipoises when measured at 20° C. and a residual vinyl acetate content of from 10 to 40% by weight;
      (B) from 0 to 75 parts of a polyvinyl acetate resin wherein the total of the polyvinyl alcohol and polyvinyl acetate components is 100 parts by weight;
      (C) from 2 to 50 parts by weight of glyoxal per hundred parts of the polyvinyl alcohol;
      (D) from 2 to 50 parts by weight of a polyol selected from the group consisting of cis 1,2-polyols and 1,3-polyols selected from the group consisting of pentaerythritol and trimethylol alkanes wherein the alkane group contains from 2 to 4 carbon atoms; and
   (II) from 80 to 98 parts by weight of an inert filler portion comprising inert fillers selected from the group consisting of asbestos, mica, calcium carbonate, talc and mixtures thereof;
   (III) from 30 to 98% by weight of water based on the total weight of the adhesive composition.

12. A dry wall joint compound as in claim 11 wherein the polyol is sorbitol.

13. A dry wall joint compound as in claim 11 wherein the polyol is mannitol.

14. A dry wall joint compound as in claim 11 which contains minor amounts of adjuvants selected from the group consisting of methyl cellulose, tricalcium phosphate, potassium tripolyphosphate, sodium acetate and mixtures thereof.

15. A dry wall joint compound as in claim 11 wherein the ratio of polyvinyl acetate to polyvinyl alcohol varies from 1:1.67 to 1.67:1.

16. A dry wall joint compound as in claim 15 wherein the polyol is sorbitol.

References Cited

UNITED STATES PATENTS 3,600,342    8/1971    Nickerson et al. ____ 260—17 R

WILLIAM H. SHORT, Primary Examiner

L. M. PHYNES, Assistant Examiner

U.S. Cl. X.R.

161—251; 260—17.4 ST, 29.6 E, 41 A, B, 874, 73 R